April 1, 1958
R. C. HOFFMAN
2,828,969
VEHICLE SUSPENSION WITH INTERCONNECTED STEERING
AND CAMBER ADJUSTING MEANS
Filed March 17, 1954
4 Sheets-Sheet 1
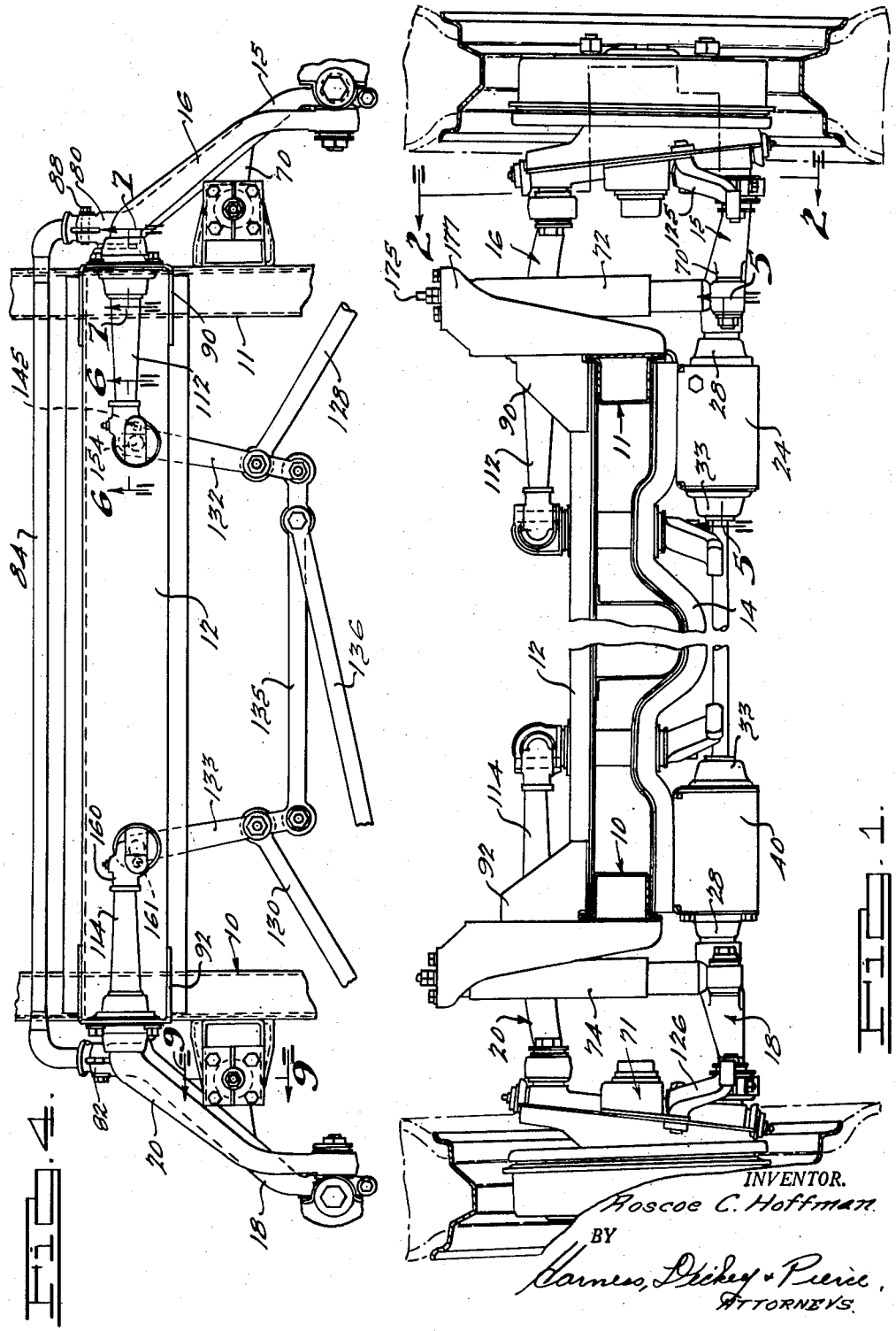
INVENTOR.
Roscoe C. Hoffman
BY
Harness, Dickey & Pierce
ATTORNEYS.

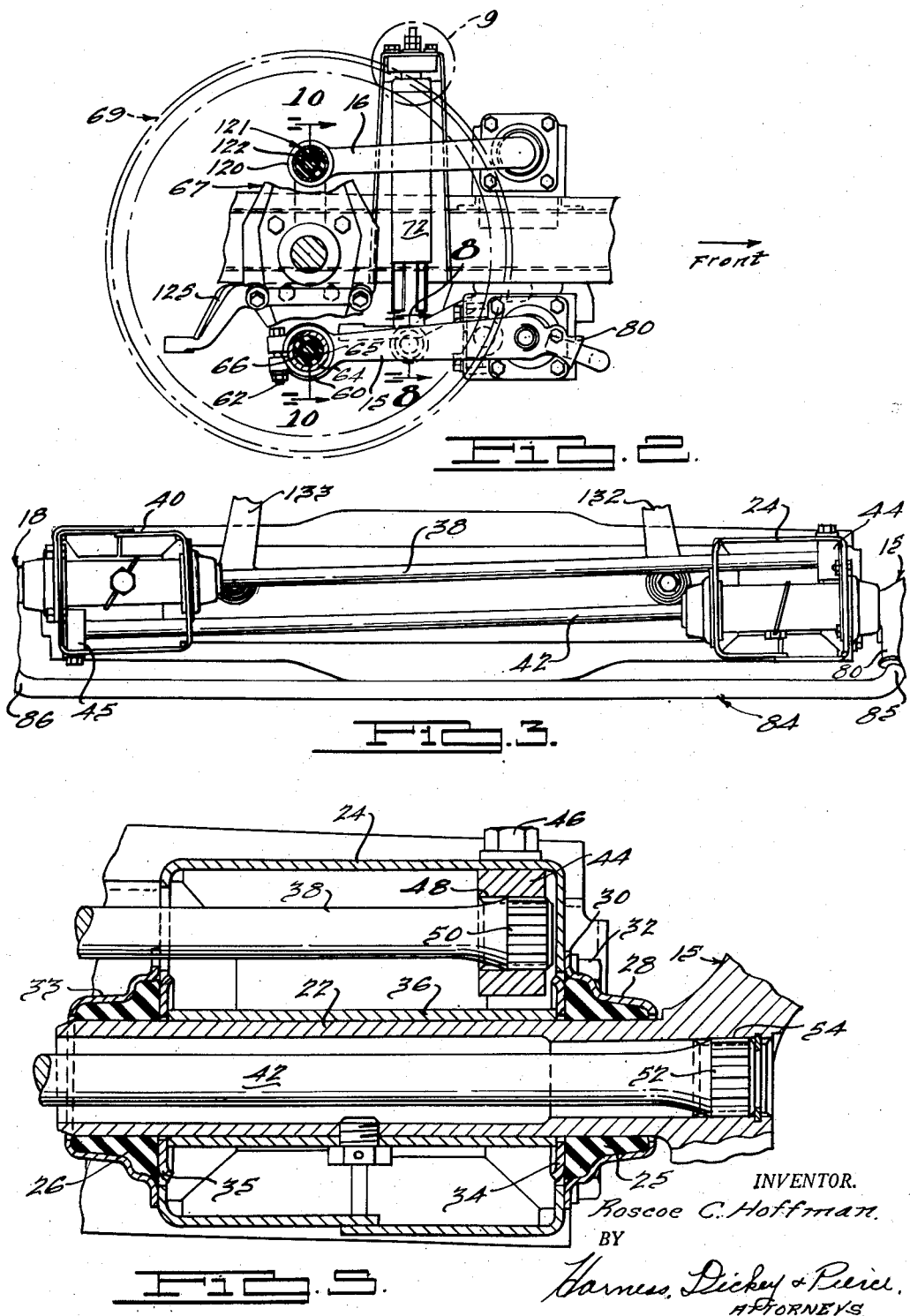

April 1, 1958 R. C. HOFFMAN 2,828,969
VEHICLE SUSPENSION WITH INTERCONNECTED STEERING
AND CAMBER ADJUSTING MEANS
Filed March 17, 1954 4 Sheets-Sheet 3
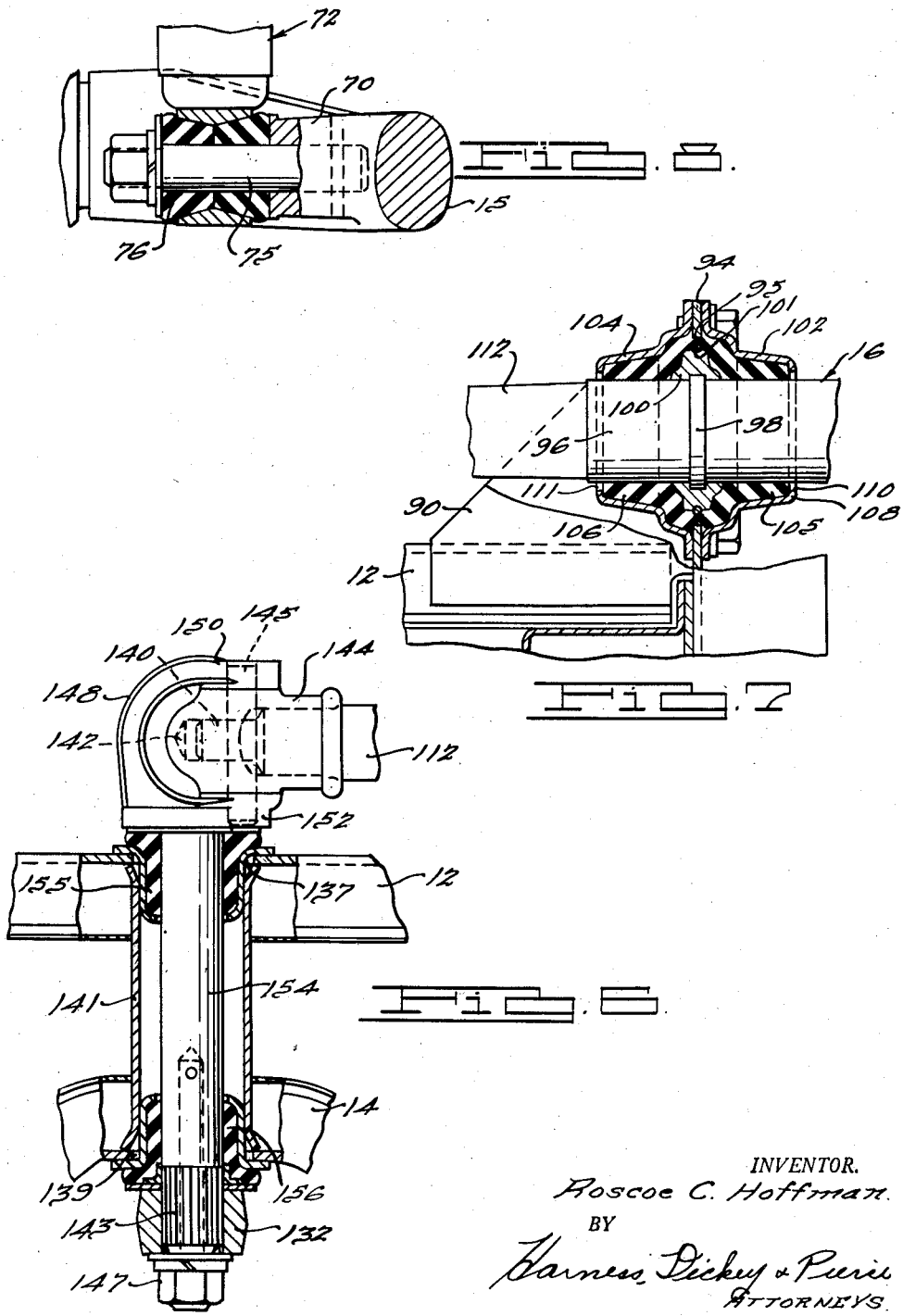
INVENTOR.
Roscoe C. Hoffman.
BY
Harness, Dickey & Pierce
ATTORNEYS April 1, 1958 R. C. HOFFMAN 2,828,969
VEHICLE SUSPENSION WITH INTERCONNECTED STEERING
AND CAMBER ADJUSTING MEANS
Filed March 17, 1954 4 Sheets-Sheet 4
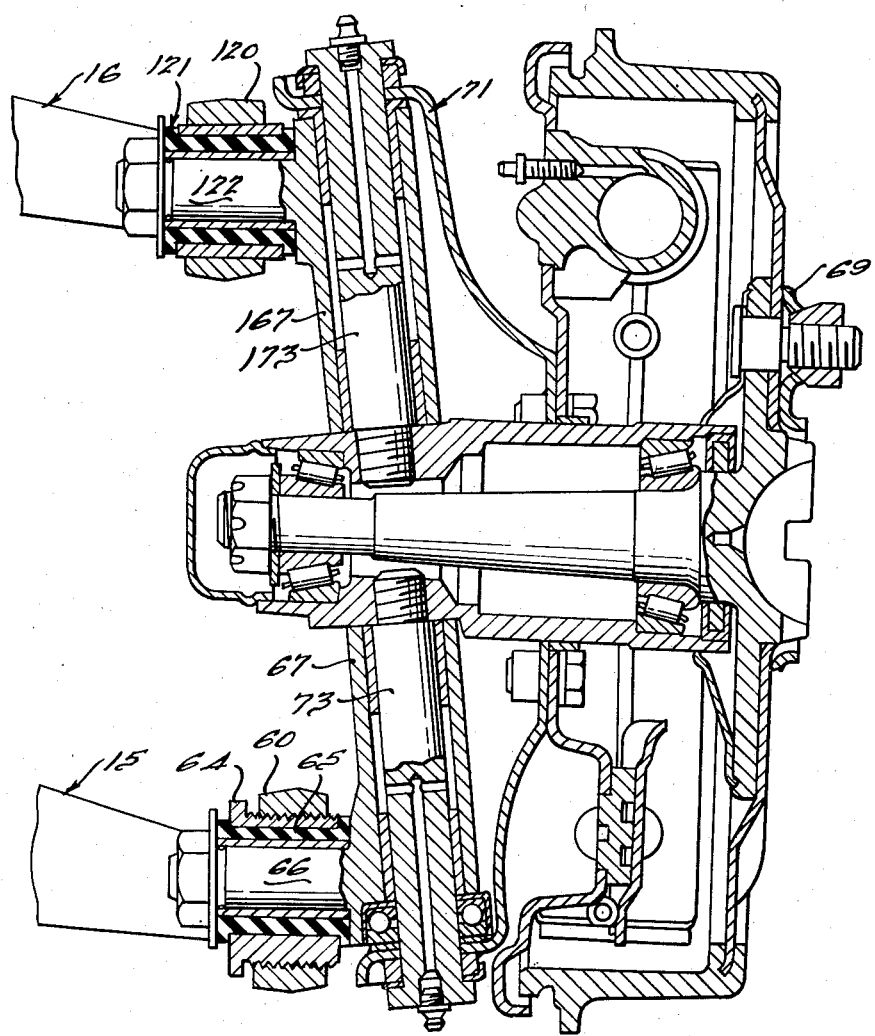
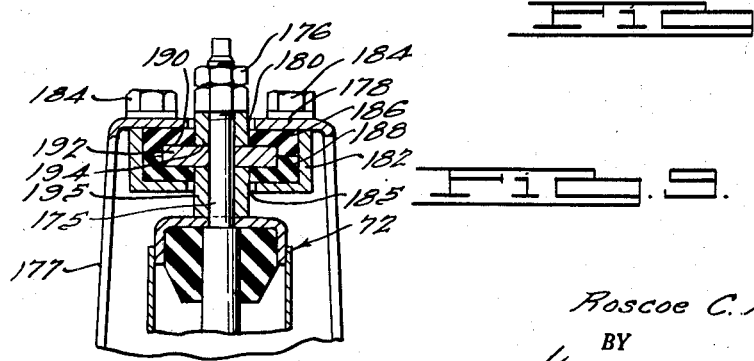
INVENTOR.
Roscoe C. Hoffman
BY
Harness, Dickey & Pierce
ATTORNEYS

United States Patent Office 2,828,969
Patented Apr. 1, 1958

2,828,969

VEHICLE SUSPENSION WITH INTERCONNECTED STEERING AND CAMBER ADJUSTING MEANS

Roscoe C. Hoffman, Detroit, Mich.

Application March 17, 1954, Serial No. 416,736

7 Claims. (Cl. 280—95)

This invention relates to wheel suspension and steering systems for motor vehicles and particularly to improved suspensions of the trailing arm type, and improved steering means adapted to coact therewith in a manner which automatically changes the camber angle of the steerable wheels as the wheels are turned about their steering axes to different angles with respect to the longitudinal vertical central plane of the vehicle.

Another object is to provide an improved suspension system of the indicated character which incorporates torsion bar springing.

Still another object is to provide a suspension system of the indicated character which is adapted for use with a sway bar of the free type having no direct connection to the vehicle chassis.

In accordance with my invention, the above and other objects which will become apparent upon consideration of this disclosure in its entirety are attained by providing two supported trailing suspension arms for each wheel, said arms being connected to the wheels by rubber-bushed joints which permit limited universal movement between the wheels and the arms, while at their vehicle ends the arms are supported through the agency of modified universal joints, also rubber-bushed, which permit limited universal movement of the arms with respect to the vehicle. During springing, the principal oscillatory movements occur about transverse axes in the normal manner of suspensions of the trailing arm type. Novel means is provided which so interconnects the steering system with the suspension arms as to alter the angular relationship between one arm of each suspension and the vehicle, in a transverse plane, and thereby change the camber angle of the wheel connected to that arm in a predetermined definite relationship with respect to the steering angle. The change of camber is preferably such that the camber angle of the wheel on the inside of a curve is increased, and the kingpin angle is decreased, while the kingpin inclination camber angle of the wheel on the outside of the curve is increased, with a corresponding change in camber. These changes are in proportion to the angle between the wheels and the straight ahead position, and to an extent which will offset the drift of the tires when rounding curves at high speed.

In the drawings:

Figure 1 is an elevation view of a suspension system incorporating the principles of this invention, fragmentarily showing adjacent portions of a motor vehicle upon which the system is installed, looking toward the front and corresponding to a transverse section of the vehicle, central portions being broken away and certain parts being removed for clarity of illustration;

Fig. 2 is a sectional elevational view taken substantially on the line 2—2 of Fig. 1 and looking in the direction of the arrows;

Fig. 3 is a bottom plan view showing principal components of the supporting spring means, sway bar and trailing arm supports;

Fig. 4 is a top plan view of the principal components of the suspension system and adjacent vehicle portions;

Fig. 5 is a cross-sectional view taken substantially on the line 5—5 of Fig. 1 and looking in the direction of the arrows;

Figs. 6 and 7 are sectional elevational views taken substantially on the lines 6—6 and 7—7 respectively of Fig. 4 and looking in the direction of the arrows;

Fig. 8 is a sectional detail taken substantially on the line 8—8 of Fig. 2 and looking in the direction of the arrows;

Fig. 9 is a sectional detail taken substantially on the line 9—9 of Fig. 4 and looking in the direction of the arrows; and Fig. 10 is a vertical diametric sectional elevational view of a front wheel and its supporting portions.

Referring now to the drawings, reference characters 10 and 11 designate generally the side rails of a motor vehicle chassis frame. A front end cross-bracing structure is illustrated in the drawings and includes an upper cross brace 12 and a lower cross brace 14. It will be recognized that the details of construction of the chassis elements may be varied and that they are illustrated to depict suitable supporting means for my improved suspension and steering system. The lower right-hand suspension control arm is generally designated 15, the upper right control arm is generally designated 16, the lower left control arm is generally designated 18, and the upper left control arm is generally designated 20. The control arms are of the trailing type, as previously mentioned. The vehicle and spring loads are carried by the lower control arms. The parts being essentially duplicated on opposite sides of the car, detailed description will be largely confined to the right-hand parts.

Each lower control arm includes a tubular hub portion as 22 oscillatably supported in a rigid sheet metal box structure 24 secured to the underside of cross brace 14. The right-hand box structure 24 is shown in horizontal section in Fig. 5, and as there shown, the hub 22 of arm 15 extends transversely of the vehicle through both side walls of the box and is supported in a pair of elastic bushings 25, 26, formed of natural or synthetic rubber or the like. One such bushing is carried by the outer surface of each side wall of the box. Rubber bushing 25 is located between the rearwardly extending portion of arm 15 and the box 24 and is held and compressed within an annular sheet metal retainer 28 of generally stepped conic form. The rubber bushing 26 which supports the inner end of the pivoted arm hub portion 22 is similarly positioned and confined by a retainer 33 mounted on the opposite wall of the box. Retainers 28, 33 are provided with flanges as 30 through which screws as 32 extend to secure the retainers to the respective side walls of the box. The opposite inner faces of the rubber bushings are flat and transverse to the hub 22 and are prevented from bulging inwardly by washers as 34, 35 which are positioned by an interposed sleeve 36 surrounding the hub 22.

Also housed within the right-hand box 24 is an anchor for a torsion bar spring 38 which at its left end is connected to the left lower control arm 18. A box 40, the construction of which corresponds to that of the box 24, is provided on the left side to support in similar fashion the left lower control arm 18 and also contains therein an anchor for the torsion bar spring 42 for the right lower control arm 15, although it will be seen that the parts are reversed in the two boxes.

As best shown in Fig. 5, the torsion bar anchor may comprise a relatively heavy metallic block as 44, securely held in the box 24 by cap screw means 46 and provided with an internally splined opening as 48. At its secured end, the torsion spring is provided with a splined head 50 interfitted with the splined opening 48 and thereby keyed against rotation. At its opposite end each torsion bar is provided with a splined head as 52 interconnected with an internally splined portion 54 formed in the control arm and concentric with the axis of oscillation thereof.

As brought out in Fig. 3, the front torsion bar spring 42 and the coaxial connected pivoted hub portion 22 of the right lower control arm 15 extend angularly forwardly as well as transversely of the vehicle toward the anchored end, lying at a slight angle to a cross plane perpendicluar to the vehicle longitudinal axis. The rearmost torsion spring bar 38 and connected pivoted portion of the left lower control arm 18 similarly extend angularly rearwardly at a slight angle, as well as transversely of the vehicle, toward the secured end, so that the centers of oscillation of the two lower control arms lie approximately on the same transverse plane.

At its rear extremity each lower control arm is provided with a radially split, clamp-type eye portion 60 adapted to be compressed, as by means of a clamping bolt 62, and within which is fitted an eccentric metallic bushing 64 within which, in turn, is an elastic bushing 65 which embraces a stud 66 secured to the lower extremity of a kingpin bushing member 67. Journaled in member 67 is a lower kingpin member 73 which is fixed with respect to a swingable knuckle spindle supporting assembly best shown in Fig. 10 and generally designated 71. The wheel 69 is rotatably carried by the supporting assembly 71 and dirigible with the latter during steering. The details of construction of the knuckle spindle supporting assembly and wheel mounting form in themselves no part of my present invention and may be varied, as will be appreciated, but preferably correspond to the disclosure of my copending application, Serial No. 428,678, filed May 10, 1954.

Each lower control arm is also provided intermediate its length with an integral bracket 70 to which the lower end of a shock absorber as 72, 74 is connected, as by a stud 75 and rubber bushings 76, illustrated in Fig. 8.

The upper end of each shock absorber is connected by means of a threaded stem 175 and jam nuts 176 to a bracket as 177, secured to the frame side rail 11. Bracket 177 has a horizontal top wall 178 having a central aperture 180 therein which is substantially larger than stem 175. A retaining cup 182 is secured to the underside of wall 178 by screws 184 and its bottom is apertured, at 185, in alignment with aperture 180. A hollow cushioning liner is housed in retainer cup 182. The liner, formed of elastic material, is comprised of two, reversely arranged edge-mating sections 186, 188 formed to provide therewithin a chamber 190 for a washer 192 mounted on stem 175. A spacer 194 is interposed between washer 192 and jam nuts 176 and a second spacer 195 is interposed between the washer and the top of the shock absorber assembly 72. The spacers and washer are tightly clamped together and against the top of the shock absorber by jam nuts 176. The liner sections 186, 188 are provided with apertures (undesignated) which fit the spacers snugly, and the spacers and stem are freely movable through the apertures 180, 185 in the bracket wall 178 and cup 182. The elastic liner assembly may be placed under compression by the tightening of screws 184 to draw cup 182 up against the bottom of wall 178. A secure but cushioned connection is thus provided between the shock absorber and the frame.

An integral socketed arm as 80, 82 also extends angularly forwardly and downwardly from the center of oscillation of each of the lower control arms, and a transverse sway bar 84 of the free type is provided, having at each of its ends a rearwardly turned portion as 85, 86 inserted and secured in the adjacent socketed arm portion and preferably locked therein as by pinch screw means 88. The intermediate portions of the sway bar extend freely through the air and do not engage any other portions of the vehicle.

The upper control arms 16, 20 are pivotally supported by individual bearing brackets 90, 92. Both of the bearing brackets 90, 92 are rigidly secured to the upper cross frame member 12, near the opposite sides of the frame. The right bracket 90 is cross-sectionally illustrated in Fig. 7, and as there shown includes a flat vertical longitudinal wall portion 94 having a transverse aperture 95 therein which is substantially larger than the transverse pivoted hub portion 96 of the control arm. The hub portion 96 of the control arm is cylindrical, and the portion thereof which lies in the same plane as the wall 94 is provided with a peripheral rib 98 over which is fitted a locating ring assembly 100 extending radially outwardly to provide a positive mechanical interlock with the retaining shells 102, 104 and having a smoothly curved outer surface. The ring assembly 100 may be formed in two semicircular sections held together by a peripheral snap ring 101. The outside diameter of ring assembly 100 lies relatively close to but is spaced from the internal surface of aperture 95. The retaining shells 102, 104 for cushioning liners 105, 106 are secured to the opposite faces of bracket wall 94. Each such retaining shell portion concentrically surrounds the pivoted hub section of the control arm and projects axially outwardly therealong. The two rubber cushioning liners 105, 106 are confined and compressed within the assmbly defined by the retainer shells 102, 104. It will be seen that the outer end of each of the retainer shells 102, 104, is turned inwardly to define a retaining flange 108 and the aperture therein for passage of the control arm therethrough is substantially larger than the hub portion 96 of the control arm encircled thereby. The space between the arm and retainer defined by such enlarged opening is designated 110 in the case of the outer retainer 102, and 111 in the case of the inner retainer 104.

The pivoted hub portion 96 of the control arm is provided with an integral coaxial extension section 112 which extends inwardly substantially horizontally toward the vehicle central plane.

The left upper control arm 20 is, as best shown in Fig. 1 and Fig. 4, provided with a similar inwardly projecting extension portion 114. Means is provided, and will presently be described in detail, for rocking the extension portions 112 and 114 toward the front and rear of the vehicle, in substantially horizontal planes, during steering movements, to thereby swing the outer ends of the upper control arms inwardly and outwardly and change the camber angles of the wheels.

As shown in Figs. 2 and 10, the wheel end of each upper control arm is provided with an eye portion 120 connected through the agency of a rubber cushioned bearing assembly 121 to the pivot stud 122 carried by an upper kingpin bushing 167 in which is journaled an upper kingpin 173 coaxial with the lower kingpin and fast in the knuckle spindle supporting structure 71. Stud 122 extends transversely of the vehicle. By reason of the elastic cushioning incorporated in all of the joints articulating the control arms to the chassis frame and to the kingpin bushings, road noise and shock are greatly reduced. Universal movement between the supported wheel and the control arms is limited, and is yieldably opposed, by the confined elastic material of the joints. It will also be observed that very little transverse movement of the lower control arm hub 22 is possible, but that the upper control arm hub 96 and extension 112 may rock through several degrees about a vertical axis extending through the rib 98. This horizontal rocking movement of the upper control arm is controlled in a manner which affords a highly advantageous automatic variation of camber and kingpin inclination during steering movements.

Connected to the knuckle spindle supporting structure 71 of each wheel is a rearwardly extending steering arm 125, 126. A steering link 128, 130, is pivotally connected to and extends angularly inwardly and forwardly from each of the steering arms 125, 126. The inner end of each of the links 128, 130, is pivotally connected to an intermediate portion of an arm 132, 133. Each of the arms 132, 133, is pivoted near its forward end for swinging about a vertical axis and extends rearwardly substantially horizontally. The rear ends of the two arms 132, 133, are pivotally interconnected by a cross link 135, to which the drag link 136 is connected. The drag link is actuatable transversely by suitable steering gear mechanism (not shown) which may be of a conventional or any desired variety.

The steering linkage thus far described will be recognized as of an essentially conventional "center point" type. The means which pivotally supports the forward end of each of the arms 132, 133, is best shown in Fig. 6. Tubular housing structures extend vertically through the upper and lower cross members 12, 14, one being located concentrically with the pivot axis of each of the arms 132, 133. Appertures 137, 139, are provided in aligned relation in the upper and lower cros members 12, 14, and the apertured areas are joined by a housing tube 141 in which a shaft 154 is supported to rotate through the angular movement which corresponds to the oscillation of the appurtenant arm, as 132, during steering. The arm is splined and secured to the lower end of the shaft, by means of splines as 143 and a nut 147.

As shown in Fig. 6, the inner end of the extension 112 is located above but relatively close to the tube 141 and is provided with a reduced cylindrical portion 140 slidably fitted in a conformably shaped socket 142, formed in a socket member 144 supported in vertical trunnion bearings as 145 carried by a yoke 148. Yoke 148 has vertically spaced, substantially horizontal arms 150, 152, and is fast upon the upper end of the vertical shaft 154. Shaft 154 is mounted in rubber cushioned bearings 155, 156, carried by the upper and lower cross members 12, 14, respectively. The axis of trunnions 145 is offset to the right from the axis of shaft 154. When the wheels are straight ahead, the axis of trunnions 145 and the axis of shaft 154 lie on a transverse plane perpendicular to the longitudinal vertical center plane of the vehicle. When the wheels are steered away from the straight ahead position, the yoke is turned to a proportional extent and trunnions 145 are thereby carried toward the rear (when the wheels are steered to the right) or toward the front (when the wheels are steered toward the left). The inner end of the inward extension 114 of the left upper control arm 20 is similarly connected to and actuatable by a socket piece 160 which corresponds to socket member 144 and which is actuatable in like fashion by the arm 133 so that the left trunnions 161 (corresponding to the right trunnions 145) move forwardly when the right trunnions move rearwardly, and vice-versa.

Reference to Fig. 4 will make it plain that, with the parts arranged as described, actuation of the steering linkage in a manner to steer the vehicle to the right will move all of the steering links and arms 136, 135, 132, 133, 128, 130, shown in Fig. 4, to the left, the arms 132, 133, being turned clockwise. Trunnion axis 145 is thereby moved rearwardly with respect to the axis of shaft 154 while the corresponding left trunnion axis is moved forwardly with relation to the axis of rotation of arm 133. Thus the extension 112 is moved rearwardly, arm 16 is accordingly swung outwardly, away from the center plane, and the camber of the right wheel, which is on the inside of the curve, is increased. The reverse is true in the case of the left wheel, which is on the outside of the curve. The extension 114 is moved forwardly, swinging the arm 20 inwardly at its rear end, and thereby decreasing the camber angle toward, and frequently beyond, zero. When turning left, the action is of course reversed. Both front wheels thus tilt inwardly in rounding a curve, greatly increasing the stability of the vehicle.

When rounding curves of relatively short radius, both wheels may be cambered inwardly with respect to the curve. When both wheels tilt inwardly in this manner during rounding of curves, the tire surfaces become frustums of cones which have their apices on the inside of the curve. The tires thus tend to roll in the direction in which the car is turning, and "follow the curve." With the present day wishbone-type suspensions, in rounding curves the wheels tend to tilt outwardly with respect to the curve, and thus become frustums of cones which have their apices toward the outside of the curve. The wheels are thus being steered in a direction away from that toward which the tires naturally tend to roll, the tires are thereby dragged and scuffed, and then to "howl."

While it will be apparent that the preferred embodiment of the invention herein described is well calculated to fulfill the objects and advantages first above stated, it will be appreciated that the invention is susceptible to variation, modification and change without departing from the fair meaning and proper scope of the appended claims.

I claim:

1. In a suspension and steering system for a wheeled vehicle, in combination, a pair of oppositely disposed steerable wheels, a pair of vertically spaced suspension arms connected to each of said wheels at vertically spaced points and supporting said wheels for springing and steering movements, each of said arms extending forwardly and rearwardly of the vehicle, an upper arm of each pair having a substantially horizontal transverse inwardly projecting extension, each such upper arm, and the extension thereof, being limitedly rockable in a transverse plane about a substantially vertical axis, steering mechanism for imparting steering movements to said wheels, and means interconnecting said steering mechanism and each of said extensions for rocking the extensions horizontally forwardly and rearwardly in opposite directions to thereby move each such upper arm transversely of the vehicle, and thereby alter the camber angle of the wheel connected thereto, during steering movements.

2. In a steerable vehicle, a frame structure, a wheel, suspension arms pivotally connected to the frame structure and having vertically spaced portions remote from the pivotally connected portions and connected to the wheel and permitting steering movements of the wheel, steering mechanism operable to impart steering movements to the wheel, a pair of vertically spaced transverse portions, one such portion being rigidly connected to each arm, a spring connected to one such transverse portion, and means responsive to actuation of the steering mechanism and connected to the other transverse portion to move the arm connected thereto laterally to change the camber of the wheel.

3. In a steerable vehicle, a frame structure, a wheel, suspension arms pivotally connected to the frame structure and having vertically spaced portions remote from the pivotally connected portions and connected to the wheel and permitting steering movements of the wheel, steering mechanism operable to impart steering movements to the wheel, a pair of vertically spaced transverse portions, one such portion being rigidly connected to each arm, a transverse torsion spring connected to one such transverse portion, and means responsive to actuation of the steering mechanism and connected to the other transverse portion to move the same, and the arm connected thereto, laterally, to change the camber of the wheel.

4. In a steerable vehicle, a frame structure, a wheel, a pair of vertically spaced suspension arms, pivot means connecting the upper of said arms to the frame structure for pivotal movement about a generally horizontal transverse axis, said pivot means including a resilient supporting portion which also permits limited rocking movement of said upper arm about a generally vertical axis, means for steerably connecting a wheel to said arms, steering mechanism operable to impart steering movements to the wheel, a pair of vertically spaced transverse portions, one such portion being rigidly connected to each arm, a transverse torsion spring connected to the transverse portion of the lower arm, and means responsive to actuation of the steering mechanism and connected to the transverse portion of said upper arm to rock the same, and said upper arm, laterally about said vertical axis to change the camber of the wheel, said steering mechanism including a steering arm swingable on a vertical axis during steering and connected to said transverse portion of the upper arm to move the same.

5. In combination with a wheeled vehicle, a spring suspension system for a steerable wheel thereof comprising two vertically spaced suspension arms, each of said arms having a free end, means for pivotally connecting to the vehicle a portion of each of said arms spaced longitudinally from the free end thereof, an upper one of said arms extending generally longitudinally of the vehicle and being oscillatable about a generally horizontal axis transverse to the vehicle on said pivotal connecting means, means for steerably connecting a wheel to the free ends of said arms, the free ends of the arms, and a wheel connected thereto, being movable vertically during springing, steering mechanism for imparting steering movements to such wheels, and means interconnecting said steering mechanism and said upper arm to move such arm laterally with respect to the vehicle, and thereby to alter the camber angle of the wheel, during steering movements.

6. A system as defined in claim 5 including a resilient cushioned bearing structure carried by the vehicle structure and incorporated in said pivotal connecting means for said upper arm, said bearing structure including elastic material distortable to permit such lateral movement of said upper arm.

7. A system as defined in claim 5 wherein said upper arm is generally L-shaped, means supporting said upper arm and at least a portion of said pivotal connecting means therefor for pivotal movement about a substantially vertical axis spaced from its free end, said interconnecting means being effective to move said arm about said vertical axis.

References Cited in the file of this patent

UNITED STATES PATENTS

| | | |
|---|---|---|
| 2,166,774 | Tjaarda | July 18, 1939 |
| 2,216,930 | Altemus | Oct. 8, 1940 |
| 2,371,864 | Woolson | Mar. 20, 1945 |
| 2,652,263 | Varnum | Sept. 15, 1953 |
| 2,678,830 | Cigan et al. | May 18, 1954 |

U. S. DEPARTMENT OF COMMERCE

PATENT OFFICE

CERTIFICATE OF CORRECTION

Patent No. 2,828,969     Roscoe C. Hoffman     April 1, 1958

It is hereby certified that error appears in the printed specification of the above numbered patent requiring correction and that the said Letters Patent should read as corrected below.

Column 3, line 9, for "perpendicluar" read -- perpendicular --; column 4, line 25, for "assmbly" read -- assembly --; line 63, for "posible" read -- possible --; column 5, line 17, for "Appertures" read -- Apertures --; line 18, for "cros" read -- cross --; column 6, line 10, for "then" read -- tend --; column 7, line 24, for "wheels" read -- wheel --.

Signed and sealed this 27th day of May 1958.

(SEAL)
Attest:
KARL H. AXLINE

Attesting Officer

ROBERT C. WATSON
Commissioner of Patents